(12) United States Patent
Quenerch'Du et al.

(10) Patent No.: US 8,794,088 B2
(45) Date of Patent: Aug. 5, 2014

(54) TELESCOPIC ACTUATOR

(75) Inventors: Marc Quenerch'Du, Paris (FR); Gërard Balducci, Saint Germain de la Grange (FR)

(73) Assignee: Messier-Bugatti-Dowty, Velizy Villacoublay (FR)

(*) Notice: Subject to any disclaimer, the term of this patent is extended or adjusted under 35 U.S.C. 154(b) by 118 days.

(21) Appl. No.: 13/488,766

(22) Filed: Jun. 5, 2012

(65) Prior Publication Data

US 2012/0304787 A1    Dec. 6, 2012

(30) Foreign Application Priority Data

Jun. 6, 2011 (FR) ...................................... 11 54898

(51) Int. Cl.
| F16H 3/06 | (2006.01) |
| F16H 27/02 | (2006.01) |
| F16H 29/02 | (2006.01) |
| F16H 29/20 | (2006.01) |

(52) U.S. Cl.
USPC ......................................................... 74/89.39

(58) Field of Classification Search
USPC ............................................. 74/89.38, 89.39
See application file for complete search history.

(56) References Cited

U.S. PATENT DOCUMENTS

| 6,116,103 A * | 9/2000 | Heckel, Jr. ................... 74/89.38 |
| 8,499,653 B1 * | 8/2013 | Sheahan et al. .............. 74/89.26 |
| 8,573,080 B2 * | 11/2013 | Quenerch'du et al. ...... 74/89.23 |
| 2011/0226075 A1 | 9/2011 | Nguyen et al. |
| 2013/0152717 A1 * | 6/2013 | Kopecek ...................... 74/89.39 |

FOREIGN PATENT DOCUMENTS

| EP | 0 265 316 A1 | 4/1988 |
| GB | 1 054 969 A | 1/1967 |
| GB | 2 475 588 A | 5/2011 |
| WO | 2008/102067 A1 | 8/2008 |

OTHER PUBLICATIONS

French Preliminary Search Report and Written Opinion for FR 11 54898 dated Dec. 20, 2011.

* cited by examiner

*Primary Examiner* — Justin Krause
(74) *Attorney, Agent, or Firm* — Sughrue Mion, PLLC

(57) ABSTRACT

The invention relates to a telescopic actuator comprising a body (1) defining a cylindrical cavity of longitudinal axis (X); a rod (3) mounted to slide telescopically in the cylinder along the said axis; a nut (7) secured to the rod; a lead screw (4) mounted on the cylinder to extend along and rotate about the said axis (X) and collaborate with the nut in such a way that a rotation of the lead screw causes a telescopic movement of the rod in the cylinder; means (8, 9, 10) for driving the rotation of the lead screw.

According to the invention, the nut is mounted on the rod to be axially retained thereon by retaining means (12, 13, 14; 30 to 38) which can be made to release the nut axially from the rod.

7 Claims, 3 Drawing Sheets

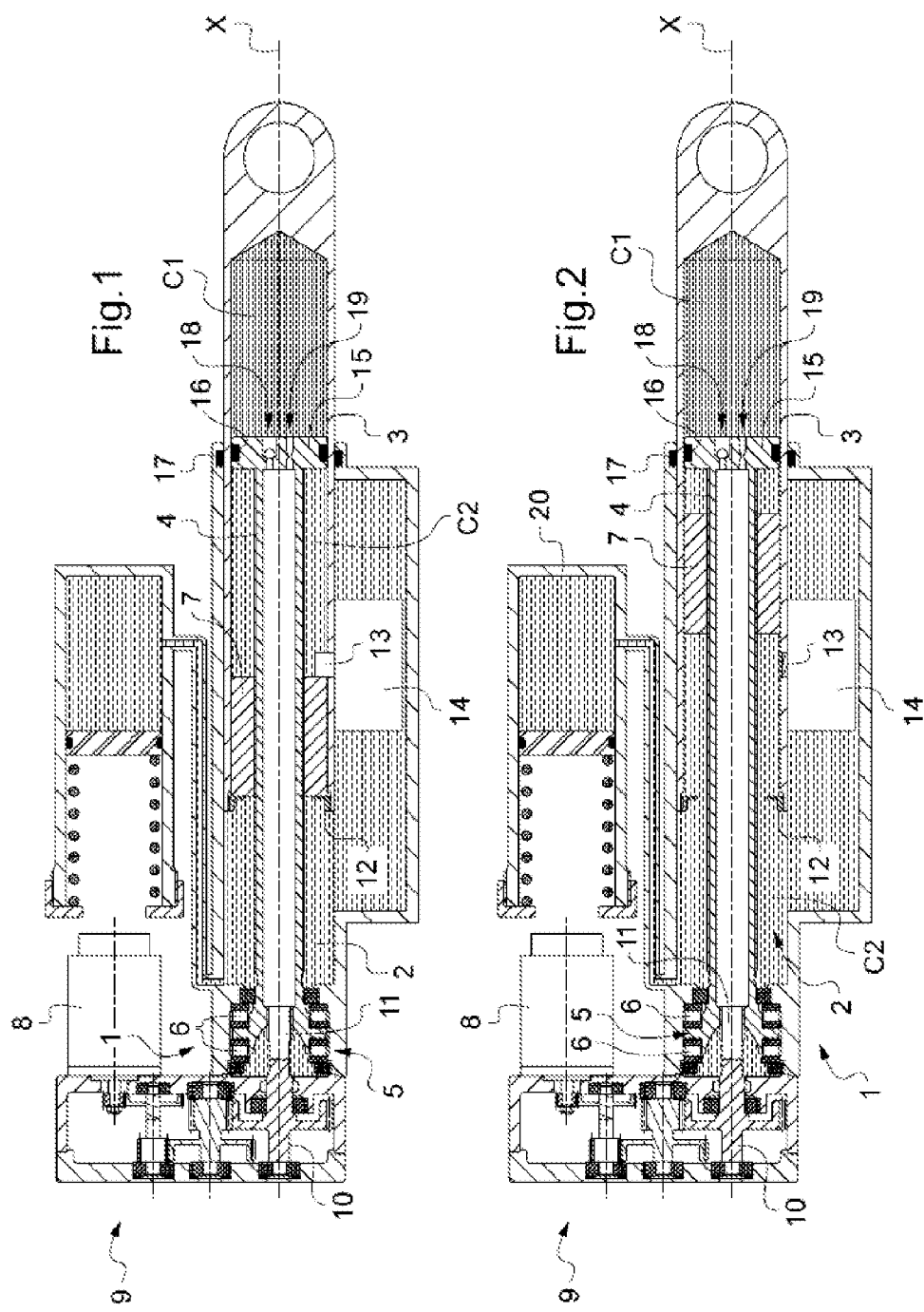

US 8,794,088 B2

TELESCOPIC ACTUATOR

The invention relates to a telescopic actuator, more especially designed for applications in which the load on the actuator tends naturally to reduce the length of the actuator. For example, such an actuator can be used to operate aircraft landing gear where the actuator is mounted in such a way that it shortens as the landing gear is deployed into the landing position.

It is important that such actuators, should they break down or lose motive power, should not oppose the movement of the landing gear into its deployed position when this landing gear is unlocked.

TECHNICAL BACKGROUND OF THE INVENTION

Document EP 2261513 discloses telescopic actuators comprising:
- a body defining a cylindrical cavity of longitudinal axis;
- a rod mounted to slide telescopically in the cylinder along the said axis;
- a nut secured to the rod;
- a lead screw mounted on the body to turn about the said axis and extend along the rod in order to collaborate with the nut in such a way that a rotation of the lead screw causes a telescopic movement of the rod in the body;
- means for driving the rotation of the lead screw.

In this type of actuator, the lead screw can be released axially to allow the rod to slide freely, for example if the means that drive the rotation of the lead screw jam. This release allows the rod to move freely under the action of the load coupled to the rod.

Thus, if such an actuator, which under normal circumstances is used to deploy and raise landing gear, develops a fault or loses its motive power, all that is then required is for the lead screw to be released and the landing gear will be able to deploy under the action of the weight of the landing gear which has a natural tendency to bring the landing gear into the deployed position.

However, in the aforementioned actuator, the action of the load tends to lenghten the actuator. Some landing gear actuating cylinders are mounted the other way around, namely such that the load has a tendency to shorten the actuator rather than to lengthen it.

The abovementioned actuator is then not capable of allowing the landing gear to move freely under its own self-weight, because this actuator cannot shorten, unless of course use is made of a reversible screw/nut connection, something which is not always possible. Further, even if it is, certain failure scenarios cause the rotating of the lead screw to jam, thus jamming the rod axially.

OBJECT OF THE INVENTION

The object of the invention is a telescopic actuator that can be shortened under the action of the load coupled to the rod, even if the screw/nut connection is not a reversible one.

BRIEF DESCRIPTION OF THE INVENTION

In order to achieve this object, the invention proposes a telescopic actuator comprising:
- a body defining a cylindrical cavity of longitudinal axis;
- a rod mounted to slide telescopically in the cylinder along the said axis;
- a nut secured to the rod;
- a lead screw mounted on the body to extend along and rotate about the said axis and collaborate with the nut in such a way that a rotation of the lead screw causes a telescopic movement of the rod in the body;
- means for driving the rotation of the lead screw.

According to the invention, the nut is mounted on the rod to be axially retained thereon by retaining means which can be made to release the nut axially from the rod.

Thus, by releasing the nut, the rod can enter the body without the nut, retained by the screw, being able to oppose this movement. Such an actuator can be shortened under the action of the coupled load, even when the means that drive the screw are faulty or unpowered.

BRIEF DESCRIPTION OF THE FIGURES

The invention will be better understood in the light of the description which follows of some particular nonlimiting embodiments, given with reference to the figures of the attached drawings in which:

FIG. 1 is a schematic cross sectional view of an actuator according to the invention, illustrated in normal operation;

FIG. 2 is a view similar to that of FIG. 1, the actuator being illustrated when the retaining means have been made to release the nut from the rod;

DESCRIPTION OF THE FIGURES

Figure 3:
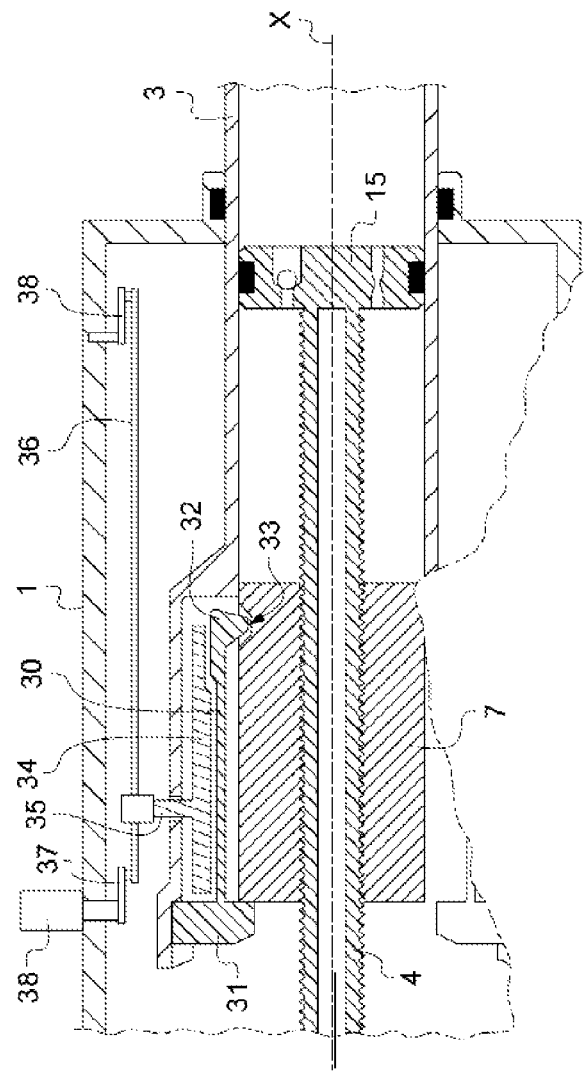
FIG. 3 is a local cross section through an actuator according to one particular embodiment of the invention, more specifically showing the connection between the nut and the rod and the associated retaining means.

With reference to FIG. 1, the telescopic actuator of the invention comprises a body 1 defining a cylindrical cavity 2 in which a rod 3 is mounted to slide telescopically. Rotation-prevention means, not depicted, prevent the rod 3 from pivoting with respect to the body 1. The cylindrical cavity 2 and the rod 3 extend along a longitudinal axis X along which the rod 3 slides.

A lead screw 4 extends along the axis X inside the rod 3 and is mounted so as to turn on the body 1 by means of a bearing 5 that is retained and mounted to rotate on the body 1 by axial thrust bearings 6. The lead screw 4 is externally threaded to collaborate with a nut 7 secured to the rod 3. Thus, a rotation of the lead screw 4 causes the rod 3 to move axially.

The lead screw 4 is driven in rotation by means of a motor 8 which, via reduction gearing 9, drives a drive shaft 10 having a splined end 11 collaborating with corresponding splines belonging to the lead screw 4. The motor is, for example, an electric motor or a hydraulic motor.

In a normal mode of operation, the application of power to the motor 8 causes the drive shaft 10 to turn, and this causes the lead screw 4 to turn and therefore causes the rod 3 to move axially.

However, it may happen that the supply of power to the motor 8 is interrupted or that the drive train from the motor 8 to the lead screw jams, causing the lead screw 4 to become immobilized in terms of rotation and therefore causing the rod 3 to become axially immobilized.

As a safeguard against this situation, and in order to allow the actuator to be shortened under the effect of the load coupled thereto, the nut 7 is axially held captive on the rod 3 between an end stop 12 of the rod, and a retaining finger 13 normally projecting into the rod and forming an obstacle that keeps the nut captive between the finger 13 and the end stop 12. The finger 13 is able to move and, if need be, is retracted by an unlocking actuator 14 as illustrated in FIG. 2, this having the effect of axially disconnecting the nut 7 from the rod 3, thus allowing the rod 3 to enter the body 1 freely under the effect of the external load. Here, the unlocking actuator 14 is secured to the rod 3 and moves with it.

According to one particular aspect of the invention, the actuator further comprises hydraulic damping means making it possible to regulate the speed at which the rod 3 moves with respect to the body 1.

These hydraulic damping means comprise a diaphragm 15 carried at the end of the lead screw 4 and carrying a seal 16 and defining in the actuator two fluidtight chambers, these being a chamber C1 in the hollow of the rod 3 and a chamber C2 in the remainder of the rod 3 and of the body 1. It will be noted that the rod 3 slides in a fluidtight manner in the body 1 by virtue of a seal 17 carried by the body 1.

The diaphragm 15 carries two members that allow the chambers C1 and C2 to be placed in fluidic communication: these are a nonreturn valve 18 that allows fluid to pass only from the chamber C2 to the chamber C1, and a restrictor 19.

As the rod deploys under the effect of the motor 8, the fluid passes freely from the chamber C2 to the chamber C1 via the nonreturn valve 18 which is in the open state. To avoid any cavitation, the chamber C2 is fluidically connected to an accumulator 20 which keeps the fluid in the chamber C1 under pressure. The accumulator 20 also acts as a reserve of fluid.

As the rod moves in, the fluid contained in the chamber C1 cannot pass through the nonreturn valve 18 and therefore passes through the restrictor 19. The fluid is therefore throttled and offers resistance which has a tendency to regulate the speed at which the rod moves in. This is of particular benefit when the rod is moving in under the effect of the external load, with the finger 13 retracted.

One particular embodiment of the retaining means that hold the nut on the rod is now described in conjunction with FIG. 3. In this example, the retaining means comprise claws associated with a rotary locking sleeve. Such a retaining device is described, for example, in document FR 2 952 414. It comprises claws 30 cut in a ring section 31 secured to the rod 3. The claws 30 have toothed ends 32 entering a groove 33 of the nut 7. The claws 30 are associated with a rotary locking sleeve 34 mounted to rotate about the axis X to sit over the claws and capable of adopting two angular positions, these being a locking position in which the sleeve prevents the claws from flexing, thus holding the nut 7 axially captive, and a release position in which the sleeve allows the claws to flex, thus allowing the nut 7 to be disconnected from the rod 3 under the action of the external load.

The rotary locking sleeve 34 is secured to a pin 35 projecting through the rod 3 and which slides along a linkage 36 extending longitudinally. The pin 35 in this respect ends in a saddle that engages with the sides of the linkage 36.

The linkage 36 is mounted on the body 1 so that it can be moved parallel to itself in an orthoradial direction (which is therefore perpendicular to the linkage). In this particular instance, the linkage 36 is associated with two cranks 37, 38 the ends of which are coupled respectively to the ends of the linkage 36. The cranks are pivot-mounted on the body 1 of the actuator. The cranks 37, 38 and the linkage 36 thus form three sides of a deformable parallelogram.

Figure 4:
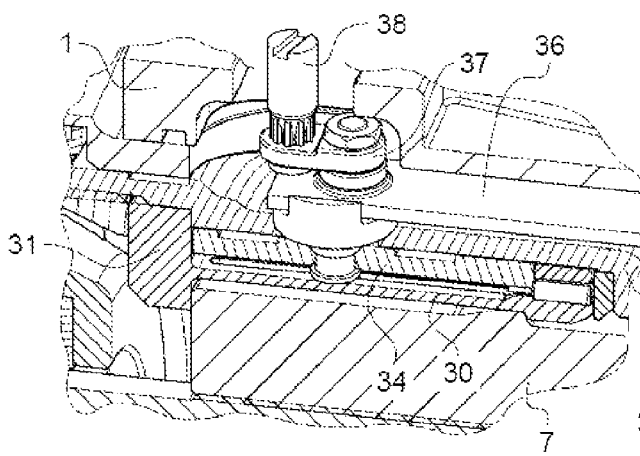
FIG. 4 is a partial perspective view with cross section of the actuator of FIG. 3, the retaining means being illustrated in the retaining position.
Figure 5:
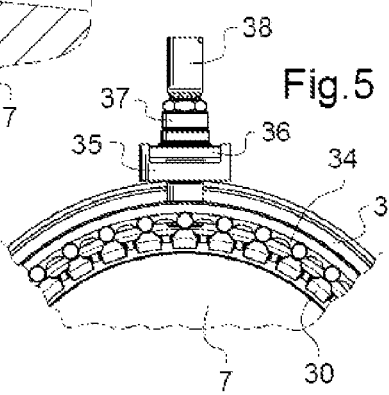
FIG. 5 is a head-on view of the retaining means in the position illustrated in FIG. 4.
Figure 6:
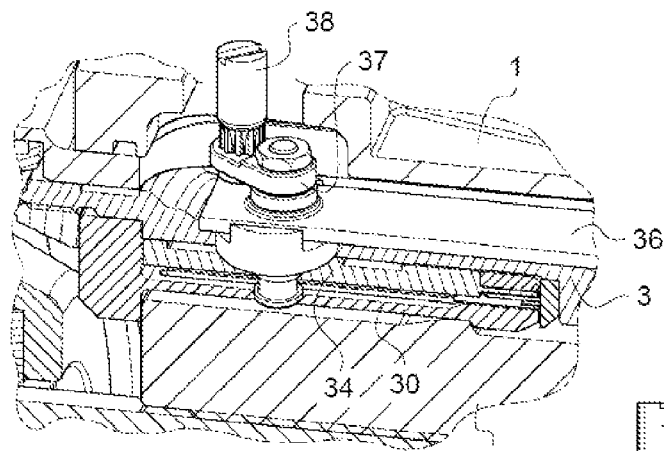
FIGS. 6 and 7 are figures similar to FIGS. 4 and 5 respectively, the retaining means being illustrated in the release position.
Figure 7:
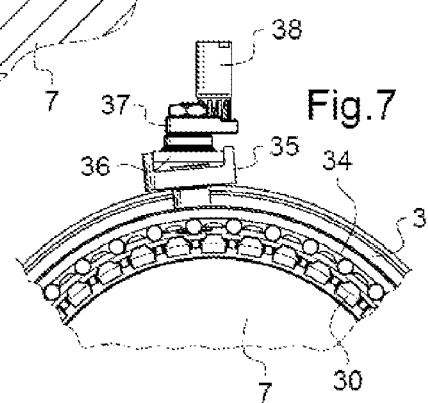

The crank 37 is associated with a rotary actuator 38 so that it can be pivoted on command between a first angular position, in which the crank 37 runs parallel to the linkage as illustrated in FIGS. 4 and 5, and a second angular position, in which the crank makes an angle with the linkage, as illustrated in FIGS. 6 and 7.

As the crank 37 moves from the first position into the second position, the linkage 36 is moved parallel to itself to the side. The linkage 36 drives the pin 35 which itself causes the locking sleeve 34 to rotate from its locking position into the position in which it releases the claws, thus causing the nut 7 to become disconnected from the rod 3.

Reverse movement from the second position into the first position causes the locking sleeve to move from the position in which the claws are released into the position in which the latter are locked.

The command to release the claws and therefore to disconnect the nut from the rod can be executed regardless of the axial position of the rod 3 in the body 1 and therefore regardless of the axial position of the pin 35 relative to the linkage 36.

The invention is not restricted to that which has just been described but on the contrary encompasses any alternative form that falls within the scope defined by the claims.

In particular, it is quite obvious that the commandable means of retaining the nut on the rod are not limited to the finger or claw devices illustrated here. Further, the member that actuates these retaining means may be mechanical, as illustrated here, or of any other form, for example electromagnetic actuation, provided that this command allows the nut to be released from the rod regardless of the axial position of the rod in the body.

The invention claimed is:

1. A telescopic actuator comprising:
   a body (1) defining a cylindrical cavity having a longitudinal axis (X);
   a rod (3) mounted to slide telescopically in the cylinder along said longitudinal axis;
   a nut (7) mounted on the rod to be axially retained thereon by retaining means (12, 13, 14; 30 to 38) which are commandable to release the nut axially from the rod;
   a lead screw (4) mounted on the cylinder to extend along and rotate about said longitudinal axis (X) and collaborate with the nut in such a way that a rotation of the lead screw causes a telescopic movement of the rod in the cylinder;
   means (8, 9, 10) for driving the rotation of the lead screw, wherein the retaining means comprises:
   claws (30) secured to the rod (3) and having ends (32) collaborating with the nut to retain the nut axially relative to the rod;
   a locking sleeve (34) sitting over the claws and mounted to rotate about the longitudinal axis (X) of the rod between an angular locking position in which the claws are prevented from flexing and an angular release position in which the claws are free to flex; and
   an actuating member designed to cause the locking sleeve to move on command from one position to another.

2. The telescopic actuator according to claim 1, in which the actuating member comprises a linkage (36) extending longitudinally and mounted with the ability to move on the body (1) so that the linkage is movable parallel to itself in an orthoradial direction, the linkage collaborating with a pin (35) secured to the locking sleeve (34) to carry the pin with the linkage as the linkage moves so as to cause the sleeve to rotate regardless of the axial position of the rod relative to the body (1).

3. The telescopic actuator according to claim 2, in which the linkage (36) is mounted with the ability to move on the body (1) by means of two cranks pivot-mounted on the body (1) and having ends connected to ends of the linkage (36).

4. The telescopic actuator according to claim 1, further comprising hydraulic damping means (15 to 20) for at least regulating the speed at which the rod enters the body when the nut has been disconnected from the rod.

5. The telescopic actuator according to claim 4, in which the hydraulic damping means comprise a diaphragm (15) carried at the end of the lead screw (4) and collaborating in a fluidtight fashion with the rod (3) to define within the actuator two hydraulic chambers, these being a first chamber C1 in a hollow of the rod (3) and a second chamber C2 in the remainder of the actuator, the first and second chambers being placed in fluidic communication by passage means (18, 19) that allow fluid to pass across the diaphragm.

6. The telescopic actuator according to claim 5, in which the passage means (18, 19) comprise a nonreturn valve that allows fluid to pass only from the second chamber C2 to the first chamber C1, and a restrictor designed to throttle the fluid as the fluid passes from the first chamber C1 to the second chamber C2.

7. The telescopic actuator according to claim 5, in which the second chamber C2 is connected to a pressurized accumulator (20).

* * * * *